US011923153B2

(12) United States Patent
Tang et al.

(10) Patent No.: US 11,923,153 B2
(45) Date of Patent: Mar. 5, 2024

(54) METHOD FOR MANUFACTURING AN Ag-BASED ELECTRICAL CONTACT MATERIAL, AN ELECTRICAL CONTACT MATERIAL AND AN ELECTRICAL CONTACT OBTAINED THEREWITH

(71) Applicant: ABB Schweiz AG, Baden (CH)

(72) Inventors: Yinglu Tang, Urdorf (CH); Moritz Boehm, Aargau (CH); Sam Bodry, Zurich (CH)

(73) Assignee: ABB Schweiz AG, Baden (CH)

( * ) Notice: Subject to any disclaimer, the term of this patent is extended or adjusted under 35 U.S.C. 154(b) by 660 days.

(21) Appl. No.: 17/034,882

(22) Filed: Sep. 28, 2020

(65) Prior Publication Data

US 2021/0098208 A1 Apr. 1, 2021

(30) Foreign Application Priority Data

Oct. 1, 2019 (EP) .................................... 19200826

(51) Int. Cl.
*H01H 11/04* (2006.01)
*B22F 3/14* (2006.01)
(Continued)

(52) U.S. Cl.
CPC ............ *H01H 11/048* (2013.01); *B22F 3/14* (2013.01); *B22F 9/04* (2013.01); *H01H 1/02376* (2013.01);
(Continued)

(58) Field of Classification Search
CPC ........ B22F 3/14; B22F 9/04; B22F 2009/041; B22F 2009/043; B22F 2301/255;
(Continued)

(56) References Cited

U.S. PATENT DOCUMENTS 3,913,201 A 10/1975 Schreiner et al.
4,141,727 A 2/1979 Shida et al.
(Continued)

FOREIGN PATENT DOCUMENTS

CN 1230566 C 12/2005
CN 101964260 A 2/2011
(Continued)

OTHER PUBLICATIONS

European Patent Office, Extended European Search Report in European Patent Application No. 19200826.6, 11 pp. (dated Apr. 22, 2020).

(Continued)

*Primary Examiner* — Donghai D Nguyen
(74) *Attorney, Agent, or Firm* — Leydig, Voit & Mayer, Ltd.

(57) ABSTRACT

A material and method for manufacturing an Ag-based electrical contact material includes synthesizing an intermetallic compound of $Me_xSn_y$ type; ball milling the intermetallic compound; mixing the so obtained intermetallic compound powder with silver powder; packing the mixed powders into a green body; and forming a MeO-$SnO_2$ cluster structure by internally oxidizing the intermetallic compound $Me_xSn_y$ while sintering the green body.

17 Claims, 7 Drawing Sheets

(51) Int. Cl.
*B22F 9/04* (2006.01)
*H01H 1/0237* (2006.01)

(52) U.S. Cl.
CPC ... *B22F 2009/041* (2013.01); *B22F 2009/043* (2013.01); *B22F 2301/255* (2013.01); *B22F 2301/40* (2013.01); *B22F 2304/10* (2013.01); *B22F 2998/10* (2013.01)

(58) Field of Classification Search
CPC .............. B22F 2301/40; B22F 2304/10; B22F 2998/10; C22C 1/1078; H01H 11/048; H01H 1/02376; H01H 1/0237; Y10T 29/49204
See application file for complete search history.

(56) References Cited

U.S. PATENT DOCUMENTS

| | | | | |
|---|---|---|---|---|
| 4,680,162 | A * | 7/1987 | Shibata | H01H 1/02376 200/266 |
| 10,699,851 | B2 * | 6/2020 | Ganguli | H01H 1/023 |
| 2007/0228334 | A1 | 10/2007 | Goia et al. | |

FOREIGN PATENT DOCUMENTS

| | | | |
|---|---|---|---|
| CN | 103276235 | B | 4/2015 |
| CN | 104498764 | A | 4/2015 |
| CN | 106233409 | A | 12/2016 |
| CN | 106517362 | A | 3/2017 |
| CN | 106564937 | A | 4/2017 |
| CN | 104946957 | B | 7/2017 |
| CN | 104741602 | B | 9/2017 |
| CN | 107794389 | A | 3/2018 |
| CN | 106191495 | B | 5/2018 |
| JP | 58-73737 | A | 5/1983 |
| JP | 4-128331 | A | 4/1992 |
| JP | 2015-196903 | A | 11/2015 |

OTHER PUBLICATIONS

China National Intellectual Property Administration, Office Action in Chinese Patent Application No. 202011050045.1, 18 pp. (dated Feb. 28, 2023).

China National Intellectual Property Administration, Office Action in Chinese Patent Application No. 202011050045.1, 10 pp. (dated Sep. 19, 2023).

* cited by examiner

METHOD FOR MANUFACTURING AN Ag-BASED ELECTRICAL CONTACT MATERIAL, AN ELECTRICAL CONTACT MATERIAL AND AN ELECTRICAL CONTACT OBTAINED THEREWITH

The present application claims the benefit of European Patent Application No. EP19200826, filed on Oct. 1, 2019, which is incorporated herein in its entirety by this reference.

BACKGROUND OF THE INVENTION

The present invention relates to a method for manufacturing an Ag-based (silver-based) electrical contact material, in particular to a method for manufacturing an Ag-based electrical contact material with improved fracture toughness, and to the relevant electrical contact material and electrical contact obtained therewith.

Generally, electrical contact materials based on silver comprise Ag—$SnO_2$ (silver-stannic oxide) composite material since it meets most of the properties required by electrical appliances and since it is less harmful than its predecessor Ag—CdO (silver-cadmium oxide). As a matter of fact, Ag—$SnO_2$ electrical contacts have been widely used for low voltage switchgear in the last years.

However, when subjected to electrical arc-induced thermo-mechanical stress, this material undergoes crack formation. The cracks propagate along the interface between $SnO_2$ particles and Ag matrix leading to unpredictable material loss and, as a consequence, to a large scatter of the expected lifetime of the material.

It has been found that this phenomenon is due to the poor adhesion between $SnO_2$ and Ag in the composite material.

In order to improve the interfacial adhesion between silver and stannic oxide, different solutions have been proposed so far. Mainly, such solutions use additive oxides, as CuO (copper oxide), or $Bi_2O_3$ (Bismuth oxide), in different forms to strengthen the interfacial adhesion between Ag and $SnO_2$ of the material.

As an example, a first known solution provides the use of powder metallurgy: Ag powder with $SnO_2$ as well as additive metal oxide powders are mixed by ball milling, either in wet form (as for example described in patent document CN103276235B) or in dry form (as for example described in patent document CN104946957B). Then the powders are pressed into a green body which is sintered and further densified.

This method presents some drawbacks. Firstly, it leads to inhomogeneity of the final material, due to mixing condition, which causes compositional segregation and limits the improvement of the interface. Secondly, this interface between Ag and the metallic oxide is formed merely physically, through external pressure, which does not result in a good adhesion.

A second solution known in the art provides the use of an internal oxidation, as for example described in patent CN1230566C, and in patent application CN104498764A. In these solutions, powders of Ag, Sn (tin) and an additive Me (metal) are melted into a pre-alloy, then particle size is decreased, by either high-energy ball milling or water atomization, and finally subjected to internal oxidation. The interface between Ag and the metallic oxide is formed on site, which gives a better adhesion.

However, the Ag/$SnO_2$ interface is not avoided. Therefore, the adhesion problem is not overcome. Moreover, it risks the dissolution of metal powder in Ag matrix in the initial pre-alloying step, which is detrimental for electrical conductivity.

A further known solution makes use of chemical synthesis. This may be obtained with either chemical plating (as known from patent documents CN104741602B and CN106191495B), water thermal method (as known from patent application CN106517362A) or sol-gel method (as known from patent application CN106564937A). These chemical methods allow silver powder to be coated homogeneously with metallic oxide. Furthermore, the in-situ chemical reaction improves interfacial adhesion.

However, these processes are complex and expensive.

Therefore, among the current state-of-the-art, all the methods for manufacturing an Ag-based electrical contact material of a known type, as well as the electrical contact material and the electrical contact obtained therewith present some drawbacks.

Hence, the present disclosure is aimed at providing a method for manufacturing an Ag-based electrical contact material which allow overcoming the above-mentioned shortcomings.

In particular, the present invention is aimed at providing a method for manufacturing an Ag-based electrical contact material which allows improving the fracture toughness of the material while being easy and inexpensive to be produced.

Furthermore, the present invention is aimed at providing a method for manufacturing an Ag-based electrical contact material which allows improving the fracture toughness of the material without undermining the electrical conductivity thereof.

In addition, the present invention is aimed at providing a method for manufacturing an Ag-based electrical contact material which allows improving the fracture toughness of the material without decreasing the homogeneity thereof.

Moreover, the present invention is aimed at providing an Ag-based electrical contact material with improved fracture toughness, which is reliable in terms of homogeneity and electrical conductivity and relatively easy to produce at competitive costs.

A further object of the present invention is to provide an Ag-based electrical contact with the same advantages of the above Ag-based electrical contact material.

These and further objects are achieved by means of a method for manufacturing an Ag-based electrical contact material comprising the steps of:

a. synthesizing an intermetallic compound of $Me_xSn_y$ type,
b. ball milling the intermetallic compound;
c. mixing the so obtained intermetallic compound powder with silver powder;
d. packing the mixed powders into a green body;
e. forming a MeO—$SnO_2$ cluster structure by internally oxidizing the intermetallic compound $Me_xSn_y$ while sintering the green body.

As better explained in the following, thanks to these steps the above-mentioned drawbacks can be overcome.

Indeed, the method of the present invention circumvents the problem related to the poor interfacial adhesion between silver and stannic oxide, thereby greatly improving the fracture toughness of Ag-based electrical contact materials and, consequently, increasing their lifetime.

In particular, thanks to the step of forming a MeO—$SnO_2$ cluster structure, it is possible to form an in-situ interface between Ag and MeO which give rise to a good adhesion and, consequently, to an enhanced fracture toughness.

Moreover, owing to the step of synthesizing an intermetallic compound $Me_xSn_y$, the method of the present invention allows avoiding reducing electrical conductivity of the material. As a matter of fact, using an intermetallic compound instead of metal and tin in metallic form, as in the above mentioned prior art, the claimed method avoids their partial dissolution in the silver matrix and, therefore, it avoids loss of electrical conductivity.

Furthermore, the combination of the above five steps allows avoiding performing complex and expensive chemical synthesis.

Summarizing, the method of the present invention achieves the manufacturing of an Ag-based electrical contact material with improved fracture toughness, high electrical properties, high homogeneity and, at the same time, is easy and inexpensive to be performed. Therefore, it achieves each of the above-mentioned objects.

Preferably, the metal of the intermetallic compound is selected among the following: copper (Cu), molybdenum (Mo), iron (Fe), manganese (Mn), nickel (Ni), indium (In), antimony (Sb). These metals have been found to be the more appropriate in terms of the properties of the final material.

Most preferably, the metal choice is copper. In fact, as it will be shown in the following examples, using such metal it is possible to achieve the longest mechanical and electrical lifetime of the final material.

According to preferred embodiments, synthesizing step a) is performed by mixing metal powder with tin powder, then melting the mixed powders and finally quenching and annealing the intermetallic compound.

Preferably, step b) of ball milling is performed so as to obtain particles of intermetallic compound with a diameter d comprised between 1 μm and 20 μm.

More preferably, such diameter d of the intermetallic compound is below 5 μm. These values of the diameter has shown to achieve the best mechanical properties in the final material, as it will be shown in the following examples.

Advantageously, the powders packing step d) is performed by pressing the powders at a pressure comprised between 50 MPa and 200 MPa. In general, the green body pressing pressure is chosen to be not too large so it limits the oxidation during sintering, meanwhile, it should not be too small so the pressed body could have a solid form and particles have enough contact among each other to enable sintering.

In a preferred embodiment, after step e) a further step f) is performed which comprises:

f. densifying the obtained material. A repressing process could be taken in order to further increase density the obtained material since final density is crucial for mechanical properties. A re-sintering step is adopted in order to remove excess strain.

In a further aspect, the present invention relates to an Ag-based electrical contact material obtained by means of the above method. Such a material owns the advantages conferred by the method.

In an additional aspect, the present invention also relates to an Ag-based electrical contact material characterized in that it comprises cluster structures of MeO—$SnO_2$.

Such structures ensure a good adhesion between silver and the cluster structure itself, thereby enhancing the fracture toughness of the material. This means avoiding early crack formations, as well as material loss, and increasing the material lifetime.

Moreover, the claimed material is homogeneous, which means a still better adhesion, and retains the desired electrical conductivity. Furthermore, an Ag-based electrical contact material with this feature is also inexpensive, because it is easy to be manufactured.

Preferably, the metal of the MeO—$SnO_2$ cluster structure is selected among: copper, molybdenum, iron, manganese, nickel, indium, antimony, since these metals confer better properties to the final material.

More preferably, the metal used is copper, since it has been found to attain better features in terms of mechanical and electrical lifetime of the material, as later shown in the following examples.

In a further aspect, the present invention also relates to an Ag-based electrical contact comprising at least one portion of the above material. The electrical contact comprising the above Ag-based material owns the same advantages of the above-mentioned material, i.e. improved fracture toughness, homogeneity and good electrical conductivity while resulting, at the same time, economical.

For the sake of clarity, it is to be specified that, in the present description and in the following claims, the term "metal", as well as its abbreviation Me, refers to chemical elements classified as metals or metalloids, that is to say, not only those showing at the left of the metal-no metal dividing line in the periodic table of elements, but also arsenic (As), tellurium (Te).

Moreover, in the present context, chemical elements and compounds are indicated by their chemical symbols, as for example Ag is used for silver, Sn for tin, Cd for cadmium, $SnO_2$ for stannic oxide, CdO for cadmium oxide, as known in the art.

BRIEF DESCRIPTION OF THE DRAWINGS

Further features and advantages of the present invention will be more clear from the description of preferred but not exclusive embodiments of a method for manufacturing an Ag-based electrical contact material, according to the present invention, of an Ag-based electrical contact material and of an electrical contact, shown by way of examples in the description, examples and drawings (incorporated in the examples), wherein.

DESCRIPTION OF THE PREFERRED EMBODIMENTS

Figure 1:
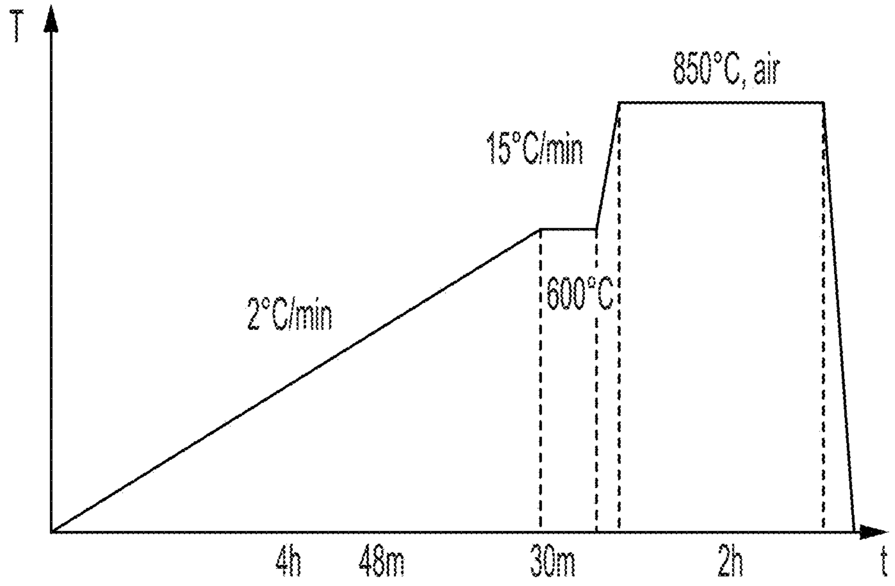
FIG. 1 shows a time-temperature sintering diagram of the green body, during step e) of the method according to a preferred way to perform the present invention.

The method for manufacturing an Ag-based electrical contact material according to the present invention provides a first step a) which comprises synthesizing an intermetallic compound of $Me_xSn_y$ type, wherein Me is a metal as defined above. In particular, stoichiometric Me and Sn powders are mixed and then melted at about 1000° C. for at least 30 min (please check). This step is preferably carried out under protective atmosphere. Afterwards, the intermetallic compound is subjected to quenching and annealing treatments under vacuum.

As far as stoichiometry is concerned, x and y may vary over a wide range depending on the metal. However, it has been found that, for a given metal, preferred values of x and y in the $Me_xSn_y$ intermetallic compound are those which give higher ratio of y/x within the availability of intermetallic phases since this enables larger proportion of SnO2 and thus higher arc erosion resistance. For example, when Me is iron, y/x=1 and 2 are both available, but FeSn2 is preferred. Other examples are Cu3Sn, Ni3Sn4.

After step a), $Me_xSn_y$ intermetallic compound is ball milled according to a second step b) of the present invention. This step is preferably carried out by use of WC (tungsten carbide) balls, in such a way to obtain the desired particle size. The particle size is modulated by varying milling time, milling balls type and the ball-material mass ratio. As better shown in the following examples, the Applicant found out that performing step b) in order to obtain particles of intermetallic compound with a diameter d comprised between 1 μm and 20 μm, and more preferably with grain size smaller than 5 μm, the final Ag-based electrical contact material shows the higher fracture toughness.

After step b), the so obtained intermetallic compound powder is mixed with silver powder, according to step c) of the method of the invention. This mixing is carried out with $ZrO_2$ (zirconium dioxide) balls with a proper ball-material ratio.

At this point, according to following step d), the mixed powders of silver and intermetallic compound, is packed into a green body. Preferably, it is a loosely packing step, which means that it is carried out by pressing the powders at a pressure comprised between 50 MPa and 200 MPa for a time lapse comprised between 1 s and 30 s.

Later on, step e) is carried out. It is performed by thermally treating the green body, in order to cause the sintering thereof and the internal oxidation of the $Me_x$-$Sn_y$ intermetallic compound. This internal oxidation causes the formation of MeO—$SnO_2$ cluster structures. They are complex cluster structures with a high $SnO_2$ content core and a high metal content surface. This is due to the fact that the metal diffuses outward, compared to Sn. Therefore, the silver contacts mainly MeO and this in-situ formation of MeO in Ag enables a very good adhesion, overcoming the above toughness problems related to these kinds of materials. In other words, the combination of the steps of the present invention attains replacing the bad Ag/$SnO_2$ interface with a good Ag/MeO interface. Moreover, the high content of $SnO_2$ in the structure core ensures a good arc erosion resistance.

According to preferred embodiments of the invention, step e) is carried out at a temperature of about 850° C. for about 2 hours under air, in the way shown as an example in FIG. 1.

Advantageously, after step e), a further step f) of densifying the obtained material is carried out.

This step aims to obtain a final material with desired microstructure and features. It preferably comprises pressing the material with a pressure comprised between 600 MPa and 900 MPa for a time lapse comprised between 1 s and 30 s and then sintering at a temperature comprised between 300° C. and 600° C. for a time lapse comprised between 1 h and 3 h.

In preferred embodiments, the metal of the intermetallic compound is selected among: copper, molybdenum, iron, manganese, nickel, indium and antimony. However, the most preferred metal is copper, as it can be easily deducted from the examples below.

According to a further aspect, the present invention also relates to an Ag-based electrical contact material comprising cluster structures of MeO—$SnO_2$.

As mentioned before, the metal of the cluster structure may be chosen among metals or metalloids elements. However, molybdenum, iron, manganese, nickel, indium, antimony and, above all, copper, are the preferred to the aims of the present invention.

The Ag-based electrical contact of the present invention comprises at least one portion of such a material comprising MeO—$SnO_2$ cluster structures.

Preferably, the whole electrical contact is made of said material.

Here follow examples of the present invention according to some preferred embodiments.

Example 1

Intermetallic phase $Cu_3Sn$ is synthesized under protective atmosphere (step a).

Stoichiometric Cu and Sn powders are mixed and melted at 1100° C. for 4 hours followed by quenching and further annealing at 650° C. under vacuum.

Figure 2:
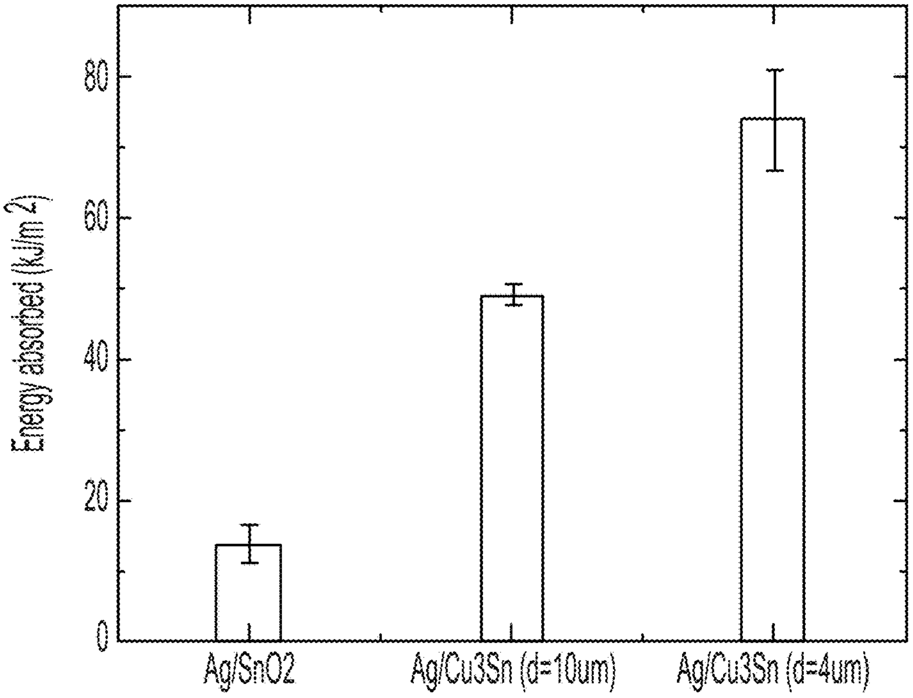
FIG. 2 shows the energy adsorbed by three samples during charpy test.
Figure 3:
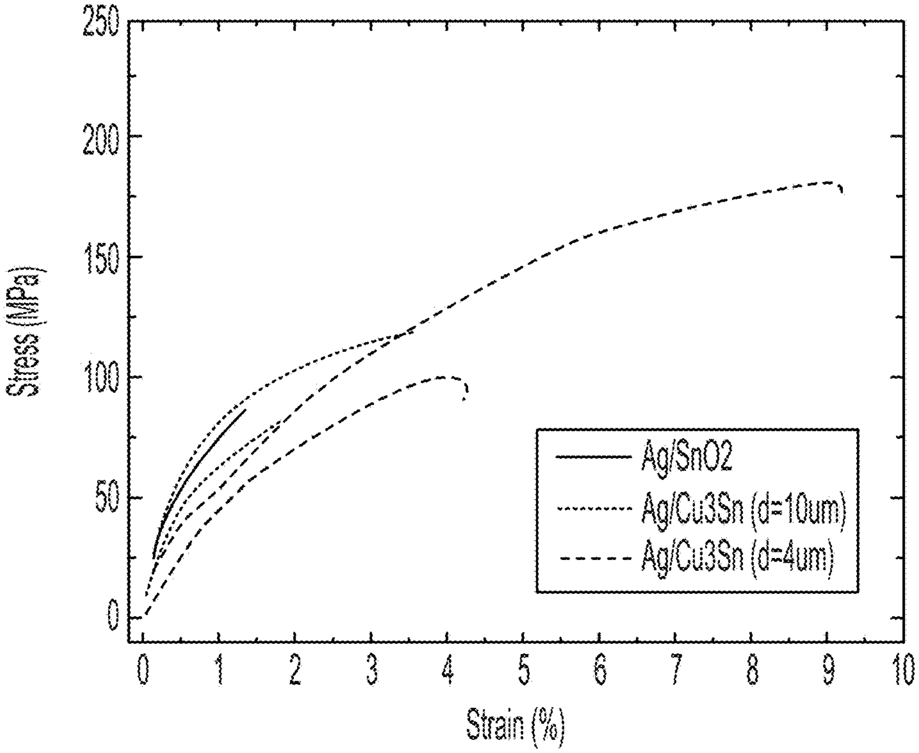
FIG. 3 shows the uni-axial tensile test results of the same three samples of FIG. 2.

The obtained $Cu_3Sn$ compound is ball milled with WC balls (ball-material mass ratio 100:1) (step b) to certain particle size. In particular, a first sample is ball milled up to 10 μm diameter and a second sample is ball milled up to 4 μm diameter in order to investigate the influence of the particle size of initial intermetallic phase $Me_xSn_y$ on fracture toughness, as shown in FIGS. 2 and 3. As a matter of fact, these figures show the possibility of tuning microstructure and mechanical property through particle size control.

$Cu_3Sn$ powder and Ag powder are mixed (step c) with $ZrO_2$ balls (ball-material mass ratio 10:1).

The mixed Ag/$Cu_3Sn$ powder is pressed with 100 MPa for 30 s (step d) and further sintered and oxidized (step e) at 850° C. for 2 h under air, as shown in the attached FIG. 1.

The as sintered Ag/$Cu_3Sn$ samples are pressed with 750 MPa for 10 s and further sintered at 450° C. for 2 h under air, achieving at least 95% density (step f).

As a comparative example also an Ag/$SnO_2$ sample is manufactured with a prior art method. It is synthesized at CHCRC with composition 86 wt % Ag, 12 wt % $SnO_2$ and 2 wt % $Bi_2O_3$.

The three samples were tested showing the results reported in FIGS. 2 and 3.

The attached FIGS. 2 and 3 show mechanical tests results on respectively: Ag/$SnO_2$ (comparative) and Ag/(Me,Sn)O samples with different initial particle size, as indicated in the figures.

In particular, FIG. 2 shows the energy absorbed during charpy tests and FIG. 3 shows the uni-axial tensile tests. As it is clearly visible from the figures, mechanical features of the materials manufactured by means of the method of the invention are largely enhanced with respect to the reference material obtained through the methods of the prior art.

Example 2

Figure 4:
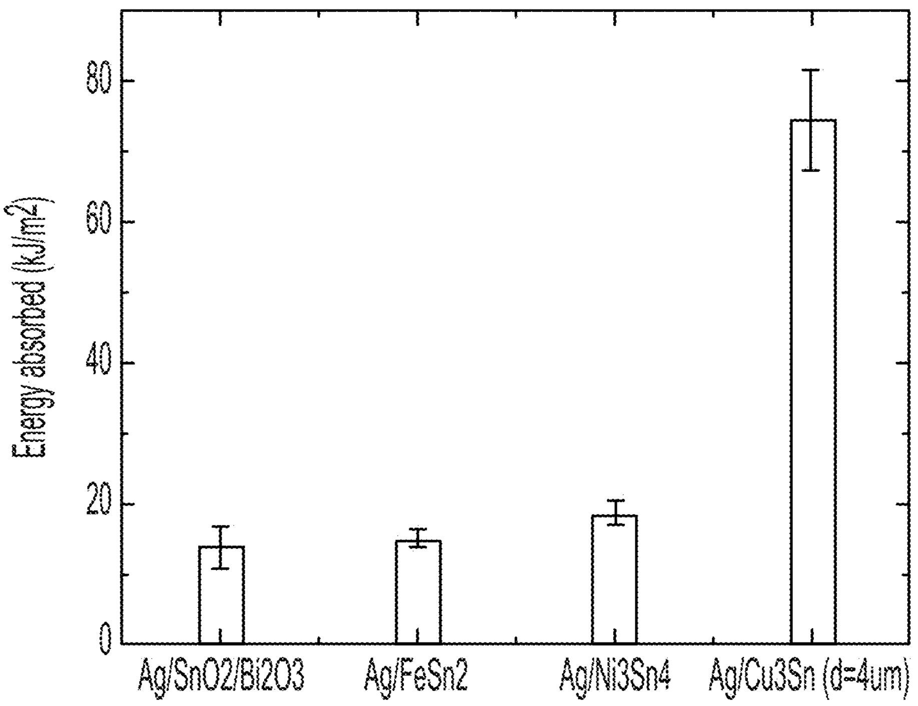
FIG. 4 illustrates mechanical lifetime test results of four samples.
Figure 5:
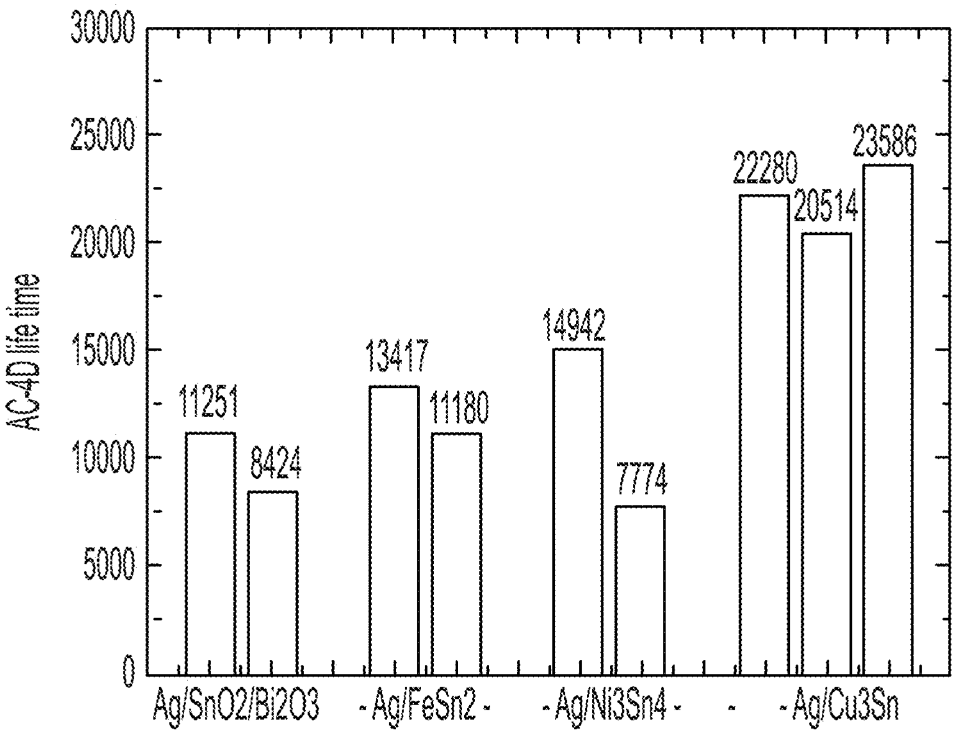
FIG. 5 illustrates electrical lifetime test results of the same four samples of FIG. 4.

The influence of different metals in the initial intermetallic phase $Me_xSn_y$ on fracture toughness and electrical lifetime was investigated, as shown in FIGS. 4 and 5 respectively.

In particular, four samples were prepared. As a comparative example, the first sample is an $Ag/SnO_2$ sample that is manufactured according to a prior art method, with composition 86 wt % Ag, 12 wt % SnO2 and 2 wt % Bi2O3.

While the remaining three were prepared using the method of the invention, starting from synthesizing three different intermetallic compounds with a particle diameter of 1-4 μm:

i. Intermetallic compound FeSn2;

ii. Intermetallic compound Ni3Sn4;

iii. Intermetallic compound $Cu_3Sn$.

The method used to manufacture Cu3Sn was the same used in Example 1.

For FeSn2 and Ni3Sn4, a solid state reaction was adopted instead to minimize the synthesis time and cost. Under H2, after being heated up to 250° C. in 1 h, the sample was held at 250° C. for 2 h to allow liquid Sn to diffuse around, and then was heated up to 750° C. in 2 h, held at 750° C. for another 12 h, finally cooled down within 1 h. For Ni3 Sn4, we get trace amount of Sn besides the majority phase Ni45Sn55. For FeSn2, due to incomplete reaction, an additional annealing step at 475° C. was performed for 2 days. Afterwards the majority phase turns out to be FeSn2, with small quantities of FeSn and Sn.

The obtained bar-shaped samples were characterized for charpy and tensile test to evaluate the fracture toughness. The attached FIGS. 4 and 5 show the results.

Both tests results indicate a light enhancement of fracture toughness and electrical lifetime in the $Ag/FeSn_2$ and $Ag/Ni_3Sn_4$ samples compared to $Ag/SnO_2$ sample. At the same time, the two figures show a great enhancement of fracture toughness of $Ag/Cu_3Sn$ sample compared to $Ag/SnO_2$ sample.

Figure 6:
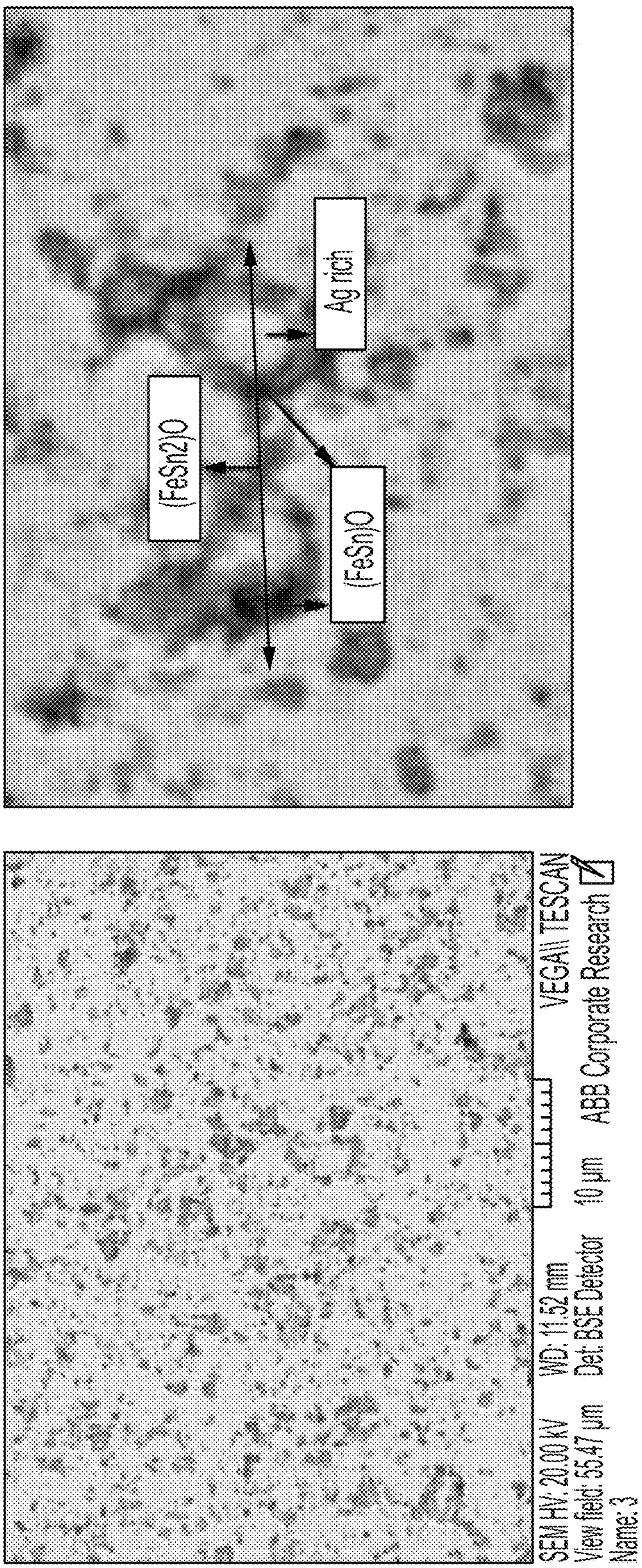
FIG. 6 is a SEM analysis illustrating the microstructure (right picture enlarged) of Ag/FeSn2 oxidized at 900° C. for 2 h.
Figure 7:
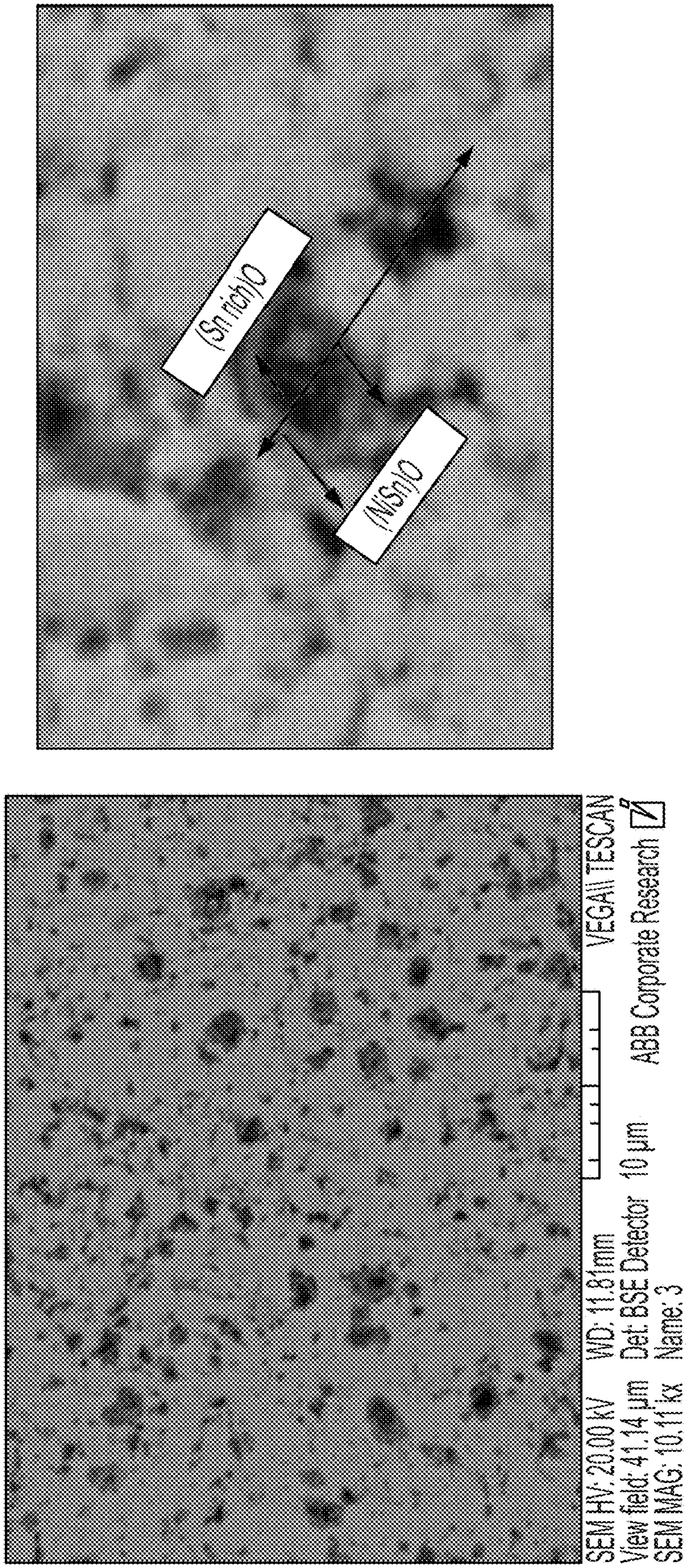
FIG. 7 is a SEM analysis illustrating the microstructure (right picture enlarged) of Ag/Ni3Sn4 oxidized at 900° C. for 2 h.
Figure 8:
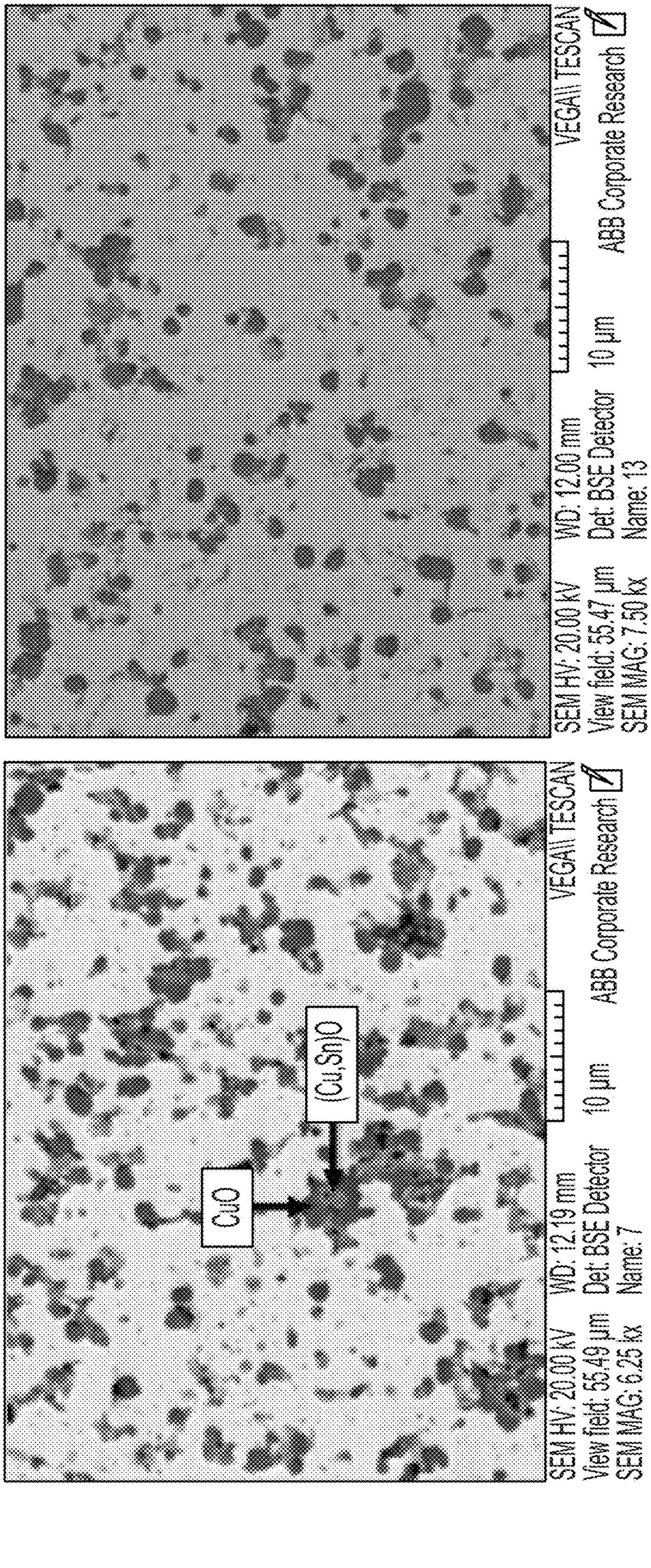
FIG. 8 is a SEM analysis illustrating the microstructure of Ag/Cu3Sn with initial Cu3Sn particle size about 10 um (left) and 4 um (right) oxidized at 850° C. for 2 h.
Figure 9:
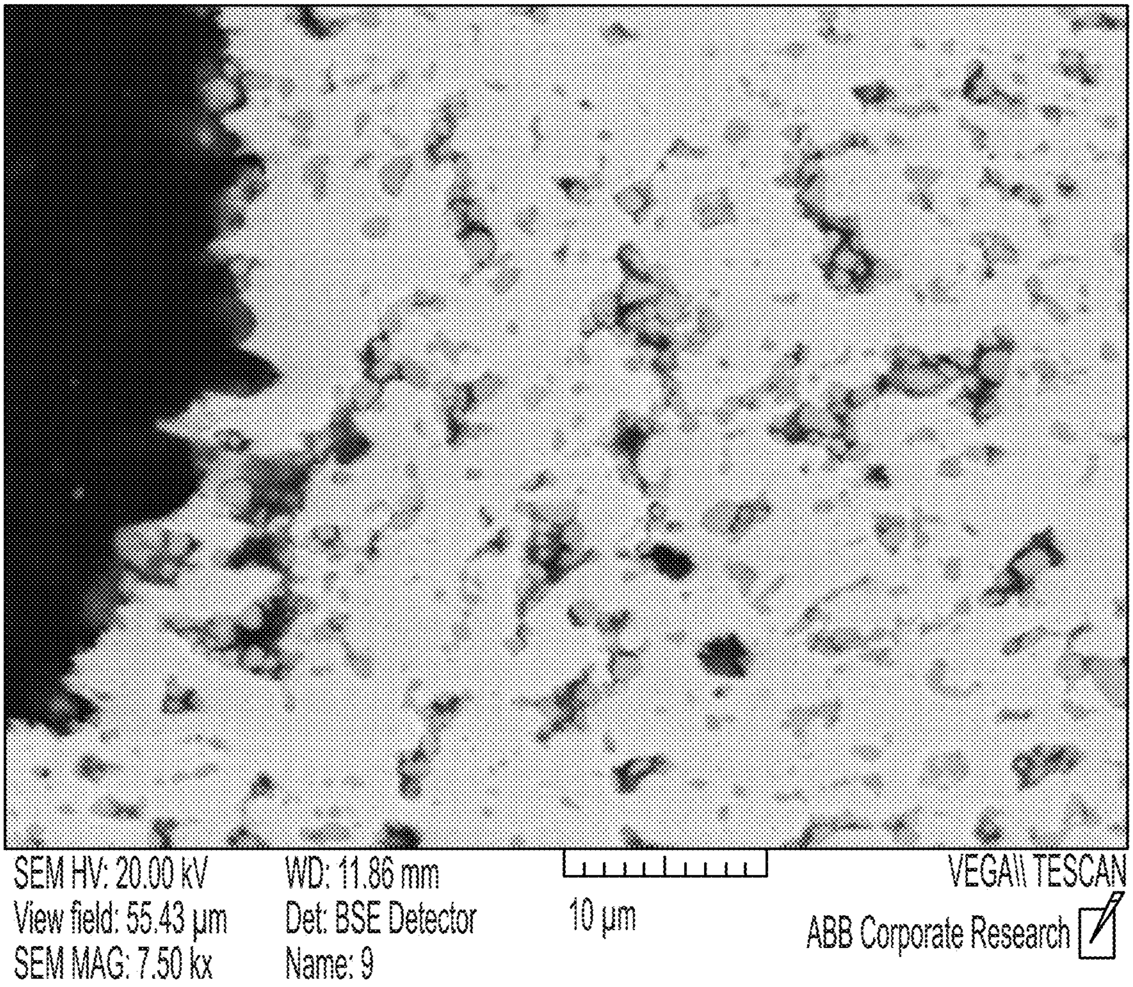
FIG. 9 is a SEM analysis illustrating the microstructure of reference Ag/SnO2.

Furthermore, SEM analysis of the fracture surface in oxidized $Ag/Me_xSn_y$ samples (FIG. 6-8) have revealed much better improvement of interface adhesion compared to prior art sample (FIG. 9).

It is clear from the above description and examples that the method according to the present disclosure, as well as the above illustrated Ag-based electrical contact material and the relevant electrical contact, fully achieve the intended aims and solved the above-highlighted problems of the existing Ag-based material manufacturing methods, Ag-based electrical contact materials and Ag-based electrical contacts.

Indeed, they overcome the adhesion problem, improving the fracture toughness of the material of the present invention, while resulting inexpensive and safeguarding a high electrical conductivity, as previously pointed out.

In addition to that, it has been found that the material of the invention are even more durable from an electrical point of view, as revealed by the above FIG. 5. For this reason it may be stated that the method of the present invention, improves both mechanical and electrical properties of the material obtained therewith.

Several variations may be made to the method for manufacturing an Ag-based electrical contact material—as well as to the electrical contact material itself and to the relevant electrical contacts—all falling within the scope of the attached claims.

The invention claimed is:

1. A method for manufacturing an Ag-based electrical contact material characterized in that it comprises the steps of:

a. synthesizing an intermetallic compound of $Me_xSn_y$ type, wherein Me is an additive metal;

b. ball milling the intermetallic compound;

c. mixing the so obtained intermetallic compound powder with silver powder;

d. packing the mixed powders into a green body; and e. forming a MeO-$SnO_2$ cluster structure by internally oxidizing the intermetallic compound $Me_xSn_y$ while sintering the green body.

2. The method of claim 1, further comprising the step of:

f. densifying an obtained material by repressing and re-sintering to release extra strain.

3. The method of claim 1, wherein Me is selected among: copper, molybdenum, iron, manganese, nickel, indium, antimony.

4. The method of claim 3, wherein Me is copper.

5. The method according to claim 1, wherein synthesizing step (a) is performed by mixing Me powder with Sn powder; melting the mixed powders; and quenching and annealing the intermetallic compound.

6. The method according to claim 1, wherein step (b) of ball milling is performed so as to obtain particles of intermetallic compound with a diameter d comprised between 1 μm and 20 μm.

7. The method according to claim 6, wherein said diameter d is less than 5 μm.

8. The method according to claim 1, wherein the powders packing step (d) is performed by pressing the powders at a pressure comprised between 50 MPa and 200 MPa.

9. The method according to claim 1, wherein after step (e) a further step (f) is performed which comprises:

f. densifying an obtained material.

10. An Ag-based electrical contact material obtained by:

a. synthesizing an intermetallic compound of $Me_xSn_y$ type, wherein Me is an additive metal;

b. ball milling the intermetallic compound;

c. mixing the so obtained intermetallic compound powder with silver powder;

d. packing the mixed powders into a green body; and e. forming a MeO-$SnO_2$ cluster structure by internally oxidizing the intermetallic compound $Me_xSn_y$ while sintering the green body.

11. An Ag-based electrical contact comprising at least one portion of a material obtained by the process of claim 10.

12. An Ag-based electrical contact material characterized in that it comprises a MeO-$SnO_2$ cluster structure.

13. An Ag-based electrical contact material according to claim 12, wherein Me is selected among: copper, molybdenum, iron, manganese, nickel, indium, antimony.

14. An Ag-based electrical contact material according to claim 13, wherein Me is copper.

15. An Ag-based electrical contact comprising at least one portion of a material obtained by the process of claim 14.

16. An Ag-based electrical contact comprising at least one portion of a material obtained by the process of claim 13.

17. An Ag-based electrical contact comprising at least one portion of a material obtained by the process of claim 12.

* * * * *